May 13, 1958     D. C. ALEXANDER ET AL     2,834,859
BONDING STRANDED NYLON JACKETED INSULATED WIRE
Filed April 1, 1957
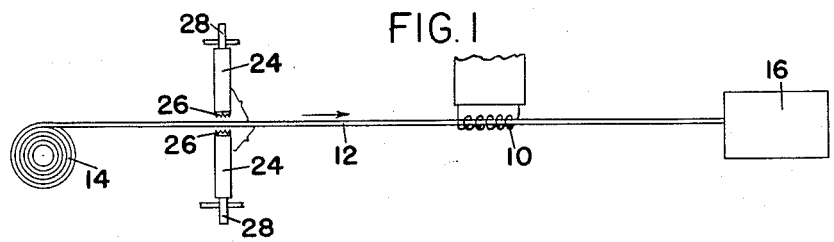
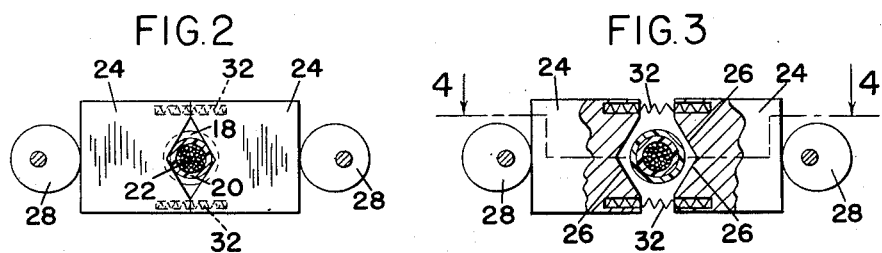
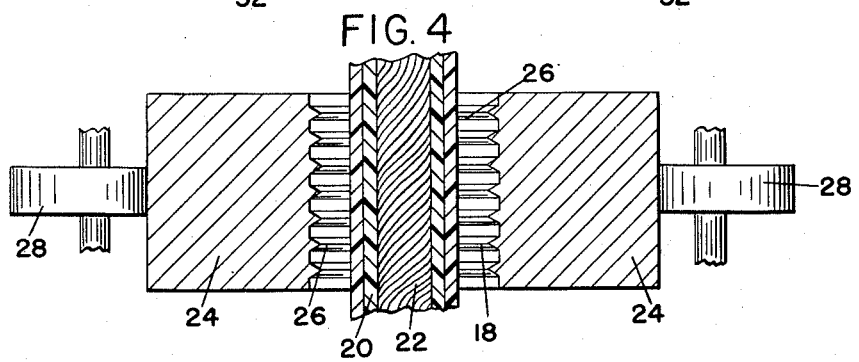
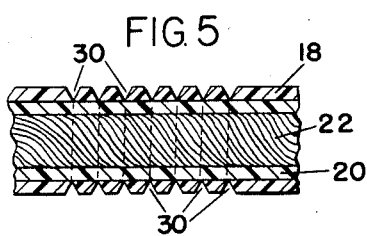
*INVENTORS*
DONALD C. ALEXANDER
HAROLD PIBUS
BY
ATTORNEY

United States Patent Office 2,834,859
Patented May 13, 1958

2,834,859

BONDING STRANDED NYLON JACKETED INSULATED WIRE

Donald C. Alexander, Paxton, and Harold L. Pibus, Sterling, Mass.

Application April 1, 1957, Serial No. 649,798

9 Claims. (Cl. 219—9.5)

This invention relates to a new and improved method and apparatus providing for bonding tinned stranded insulated wire, and more particularly to improve the bonding of the tinned strands prior to cutting and stripping of the wire in cases where nylon jacketing is provided over the insulation which is a thermoplastic such as e. g. poly-vinyl chloride plastic material.

In the prior art, it has been found very advantageous to bond the tinned strands of poly-vinyl insulated wire at pre-selected spaced areas, prior to the cutting and stripping operation by a well-known automatic wire measuring, cutting and stripping machine, to the end that the exposed tinned ends of the stranded wire are bonded in an efficient manner under the insulation, and when the insulation is stripped away, the exposed wires are in condition for application as leads in electrical manufacturing of any kind in which such wires are needed, such as in radio and television receiving apparatus, and in many other relationships. In this connection, attention is directed to U. S. patent to Mitchell, No. 2,636,408, which discloses a method for bonding and stripping an end of insulated, pre-tinned stranded wire.

The present invention provides a method and apparatus wherein such wire is processed in order to provide bonded strands at predetermined intervals in the progressing wire as it is led to the automatic wire stripper in cases where the wire is provided with a nylon jacket on the poly-vinyl or similar insulation. In many cases, it is advantageous to provide such a nylon jacket to improve the quality of the insulation and improve the characteristics of and resistance to abrasion as well as resistance to chemicals, and other deleterious substances and conditions.

When insulated stranded wire is provided with a nylon jacket, it has been found in the past that the prior art methods for bonding the pre-tinned strands is not satisfactory, and the present invention provides means and method for overcoming this difficulty.

Other objects and advantages of the invention will appear hereinafter.

Reference is to be had to the accompanying drawings, in which:

Fig. 1 is a diagram illustrating a system embodying the present invention, utilizing a known automatic cutting and stripping machine;

Fig. 2 is a view in elevation, partly in section, illustrating a means for carrying out the present invention;

Fig. 3 is a view similar to Fig. 2 but showing the parts in a different disposition;

Fig. 4 is a section on line 4—4 of Fig. 3 on an enlarged scale; and

Fig. 5 is an enlarged section illustrating the nylon jacket wire after being processed according to the present invention.

In utilizing prior art methods for bonding tinned stranded wire having a nylon jacket, it has been found that the tinned strands do not bond satisfactorily. Hydrochloride gas is given off in small quantities by the poly-vinyl insulation at about the melting temperature of tin. This gas in small amounts is known to act as a soldering flux, aiding the fusing of the tinned strands of the wire when heat is applied, as for instance by the coil 10 to the intermittently traveling insulated wire 12 in the direction of the arrow in Fig. 1.

However, when a nylon jacket is applied to the poly-vinyl insulation such bonding is relatively poor. Nylon is of a higher degree of imperviousness to the hydrogen chloride gas, and it would appear that the nylon jacket holds this gas in upon the strands of the wire long enough to not only fail to improve the soldering action but actually to inhibit fusing, whereas without the nylon jacket, excess of the gas apparently may escape sufficiently through the poly-vinyl insulation. Also, the hydro-chloride is apt to catalyze the action of decomposition of the vinyl insulation to a small extent and may even cause corrosion of the wire.

In any event, regardless of the cause of the unsatisfactory results in attempting to bond the tinned strands of nylon jacketed wire under conditions of heat applied through the insulation, the present inventors have found that if the nylon jacket surrounding the poly-vinyl chloride be pierced or interrupted at the point where it is desired to form the bonding action on the tinned strands, then the fusing action takes place in a highly satisfactory manner and the difficulty has been found to be overcome in this way.

In general, the wire 12 is led from a reel or spool 14 in intermittent steps by means of well known mechanism embodied in the automatic wire measuring, cutting and stripping machine represented at 16, and as it passes through the coil 10, the individual pre-tinned strands are fused and then later in this area the stripper 10 cuts the wire and strips the ends in exactly the same area that has been previously bonded. The bonding effect does not take place at any area except where the wire is to be stripped in a subsequent step as described.

The present invention provides for actuating means to puncture intermittently at spaced areas the nylon jacket 18 surrounding the poly-vinyl chloride insulation 20 which covers the strands 22, this puncturing means being arranged in automatic timed relation with intervals of rest of the intermittent feed of the progressing wire. These puncturing members are indicated by the reference numeral 24 as provided with punches or cutters 26, 26 mounted on the members 24 and in turn urged toward each other and toward the wire passing between the same, by any means such as for instance rotary cams 28. The rotary cams 28 are of course adapted to be driven by any power means in timed relationship so that the spaced areas of puncture of the nylon jacket are also the same areas processed later by the heat applied by the coil 10, or other means, and thereafter cut and stripped by the automatic machinery 16.

It is pointed out that the nylon jacket 18 is actually disrupted to some extent as indicated by the reference numeral 30 in Fig. 5 showing a series of notches in the nylon, which notches are made by the cutting or punching teeth at 26 on the members 24. These notches preferably extend all the way through the nylon jacket and could actually extend into the poly-vinyl insulator because in this area all of the insulation is later removed and the strands 22 are bonded in this exact area. Furthermore, the interruption to the nylon may be accomplished by heated means as well as by cutters or any other device which might be conveniently utilized for this purpose, and the invention is by no means restricted to the cutting teeth 26.

Any means may be provided to separate the members 24 to allow the next index or step-by-step feed of wire 12, but as shown in Fig. 3, springs 32 may conveniently be utilized for this purpose, these springs acting against the action of cams 28.

The teeth 26 may assume any shape or form desired as long as the disruption of the nylon jacket is accomplished.

By using the above described method and apparatus, it has been found that nylon jacketed vinyl-insulated pre-tinned stranded wire fuses very satisfactorily, without decomposition of the vinyl insulation or corrosion of the wire.

Having thus described our invention and the advantages thereof, we do not wish to be limited to the details herein disclosed, otherwise than as set forth in the claims, but what we claim is:

1. The method for bonding and stripping an end of insulated, nylon jacketed tinned stranded wire comprising forming gaps in the nylon jacket at the portion of the insulation that is to be stripped, bonding the tinned strands by application of heat at the gapped portion of the wire, and then cutting the nylon jacket and insulation off at the bonded area.

2. The method for stripping an end of insulated, nylon jacketed tinned stranded wire comprising piercing the nylon jacket in the area to be stripped, then applying heat to the pierced area to bond the strands, and lastly stripping the insulation and jacket from the pierced, bonded area of the wire.

3. The method of bonding the strands of a plastic insulated tinned stranded wire having a denser plastic jacket comprising the steps of piercing the jacket to expose the underlying plastic insulation, applying heat at the exposed area, and then stripping the pierced portion of the jacket and the underlying insulation from the bonded portion only of the wire.

4. The method for bonding and stripping an end of poly-vinyl insulated nylon jacketed tinned stranded wire comprising forming gaps in the nylon jacket to substantially expose the poly-vinyl insulation at the portion of the insulation that is to be stripped, bonding the tinned strands by application of heat at the gapped portion of the wire, and then cutting the nylon jacket and insulation off at the bonded area.

5. The method of bonding the strands of a poly-vinyl chloride insulated tinned stranded wire having a denser plastic jacket comprising the steps of piercing the jacket to expose the underlying poly-vinyl insulation, applying heat at the exposed area, and then stripping the pierced portion of the jacket and the underlying insulation from the bonded portion only of the wire.

6. Apparatus for bonding the tinned strands of a poly-vinyl chloride insulated wire having a nylon jacket comprising means to intermittently feed a length of the wire longitudinally along a path, a nylon jacket piercing device, means to heat the wire, and a wire stripping station, said piercing device and heating means being spaced along the path of the wire and operatively arranged to act thereon at the same areas thereof seriatim prior to the positioning of the wire at the stripping station.

7. Apparatus for bonding the tinned strands of a plastic insulated wire having a denser plastic jacket comprising means to intermittently feed a length of the wire longitudinally along a path, a jacket piercing device, means to bend the wire, a wire stripping station, said piercing device and heating means being spaced along the path of the wire and operatively arranged to act thereon at the same areas only thereof seriatim prior to the positioning of the wire at the stripping station.

8. Apparatus for bonding the tinned strands of a plastic insulated wire having a denser jacket thereon, comprising means intermittently feeding the wire longitudinally, means forming gaps in the denser jacket, heating means spaced along the path of the wire and arranged to act thereon at the areas in which the gaps appear, and means operating the jacket gapping means in timed relation with respect to the intermittent feed of the wire.

9. The method of bonding the strands of a plastic insulated tinned stranded wire having a denser jacket thereon comprising the steps of forming gaps in the jacket to expose the underlying plastic insulation, applying heat at the gapped area, and then stripping the gapped portion of the jacket and the underlying insulation from the bonded portion only of the wire.

References Cited in the file of this patent

UNITED STATES PATENTS

| | | |
|---|---|---|
| 2,415,669 | Beuschel | Feb. 11, 1947 |
| 2,636,408 | Mitchell | Apr. 28, 1953 |